(12) United States Patent
Shinohara

(10) Patent No.: US 8,775,118 B2
(45) Date of Patent: Jul. 8, 2014

(54) ANGLE DETECTION APPARATUS

(75) Inventor: Makoto Shinohara, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 344 days.

(21) Appl. No.: 13/234,025

(22) Filed: Sep. 15, 2011

(65) Prior Publication Data

US 2012/0197591 A1 Aug. 2, 2012

(30) Foreign Application Priority Data

Feb. 1, 2011 (JP) .................................. 2011-019397

(51) Int. Cl.
*G01C 19/00* (2013.01)

(52) U.S. Cl.
USPC ............................ 702/151; 702/182; 702/189

(58) Field of Classification Search
USPC ........... 702/151, 182, 189; 341/115, 116, 138
See application file for complete search history.

(56) References Cited

U.S. PATENT DOCUMENTS

| 8,514,110 B2 * | 8/2013 | Takahashi ...................... 341/115 |
| 2011/0090104 A1 | 4/2011 | Sata et al. | |
| 2012/0130517 A1 * | 5/2012 | Chiu et al. ...................... 700/94 |

FOREIGN PATENT DOCUMENTS

JP 2006-58232 3/2006

* cited by examiner

*Primary Examiner* — Elias Desta
(74) *Attorney, Agent, or Firm* — White & Case LLP

(57) ABSTRACT

According to one embodiment, in the angle detection apparatus, the first A-D converter unit receives the first signal, and performs analog-to-digital conversion of the first signal. The second A-D converter unit receives the second signal orthogonal to the first signal, and performs analog-to-digital conversion of the second signal. The first delay circuit receives a third signal outputted by the first A-D converter unit, and performs a phase adjustment of the third signal. The second delay circuit receives a fourth signal outputted by the second A-D converter unit, and performs a phase adjustment of the fourth signal. The phase detection adjustment unit monitors phases of signals outputted by the first and second delay circuits, and gives phase adjustment commands to the first and second delay circuits, when a phase shift occurs.

20 Claims, 11 Drawing Sheets

ANGLE DETECTION APPARATUS

CROSS REFERENCE TO RELATED APPLICATION

This application is based upon and claims the benefit of priority from the prior Japanese Patent Application No. 2011-019397, filed on Feb. 1, 2011, the entire contents of which are incorporated herein by reference.

FIELD

Embodiments described herein relate to an angle detection apparatus.

BACKGROUND

In an angle detection apparatus of a rotary shaft of a motor or the like, a resolver is used for angle detection. The resolver receives an excitation signal, and generates signals by amplitude-modulating the excitation signal in accordance with a rotation angle.

Two angle signals (i.e. a SIN $\Phi$ component and a COS $\Phi$ component of an angle) outputted by the resolver may have a phase shift due to influence of a signal delay in propagation from the resolver to digital conversion. The occurrence of the phase shift leads to the problem of deterioration in accuracy of angle detection of the rotary shaft. Also, the occurrence of a change in amplitude leads to the problem of the deterioration in the accuracy of the angle detection of the rotary shaft.

DETAILED DESCRIPTION

Figure 1:
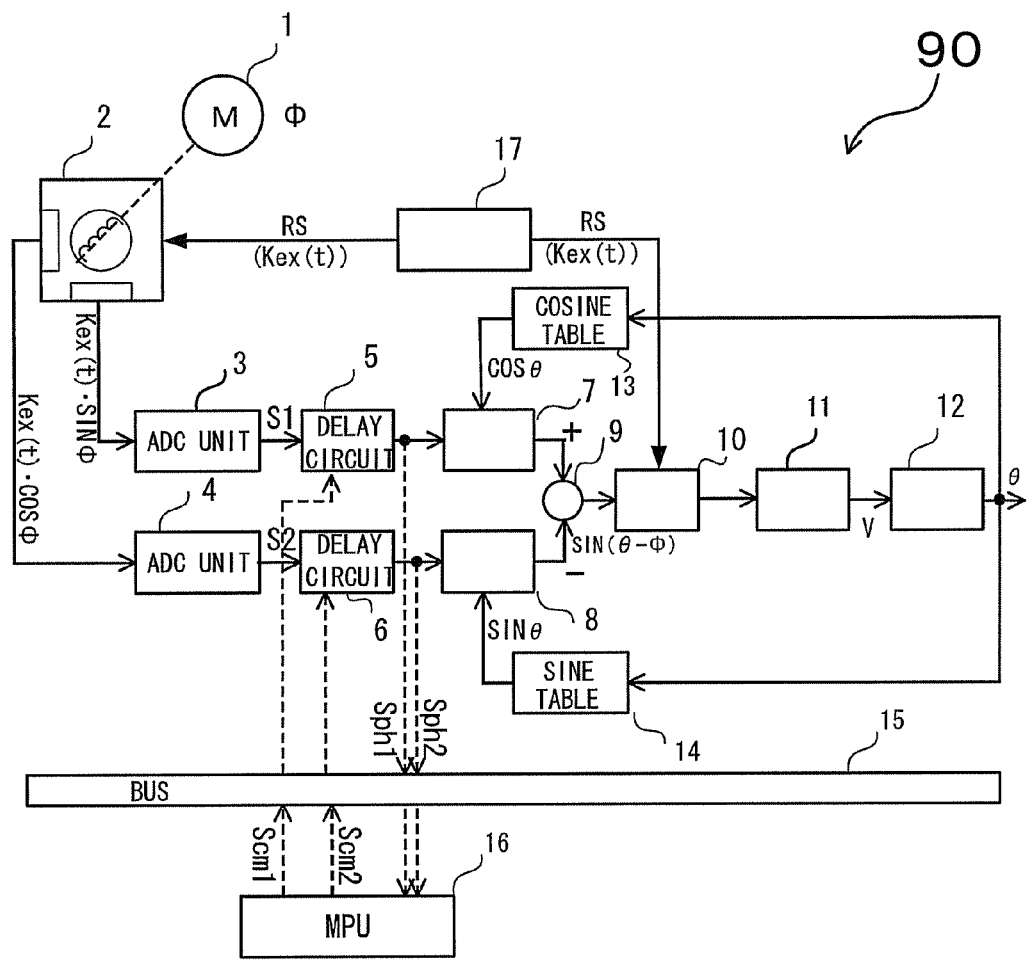
FIG. 1 is a block diagram showing an angle detection apparatus according to a first embodiment.

According to one embodiment, an angle detection apparatus performs angle detection of a rotary shaft of a rotating device, and generates a first signal and a second signal orthogonal to the first signal by amplitude-modulating an excitation signal in accordance with a rotation angle using a resolver. The first A-D converter unit receives the first signal, and performs analog-to-digital conversion of the first signal. The second A-D converter unit receives the second signal, and performs analog-to-digital conversion of the second signal. The first delay circuit receives a third signal outputted by the first A-D converter unit, and performs a phase adjustment of the third signal. The second delay circuit receives a fourth signal outputted by the second A-D converter unit, and performs a phase adjustment of the fourth signal. The phase detection adjustment unit monitors phases of signals outputted by the first and second delay circuits, and gives phase adjustment commands to the first and second delay circuits, when a phase shift occurs.

Plural further embodiments will be described below with reference to the drawings. In the drawings, the same reference numerals designate the same or similar portions.

Figure 2:
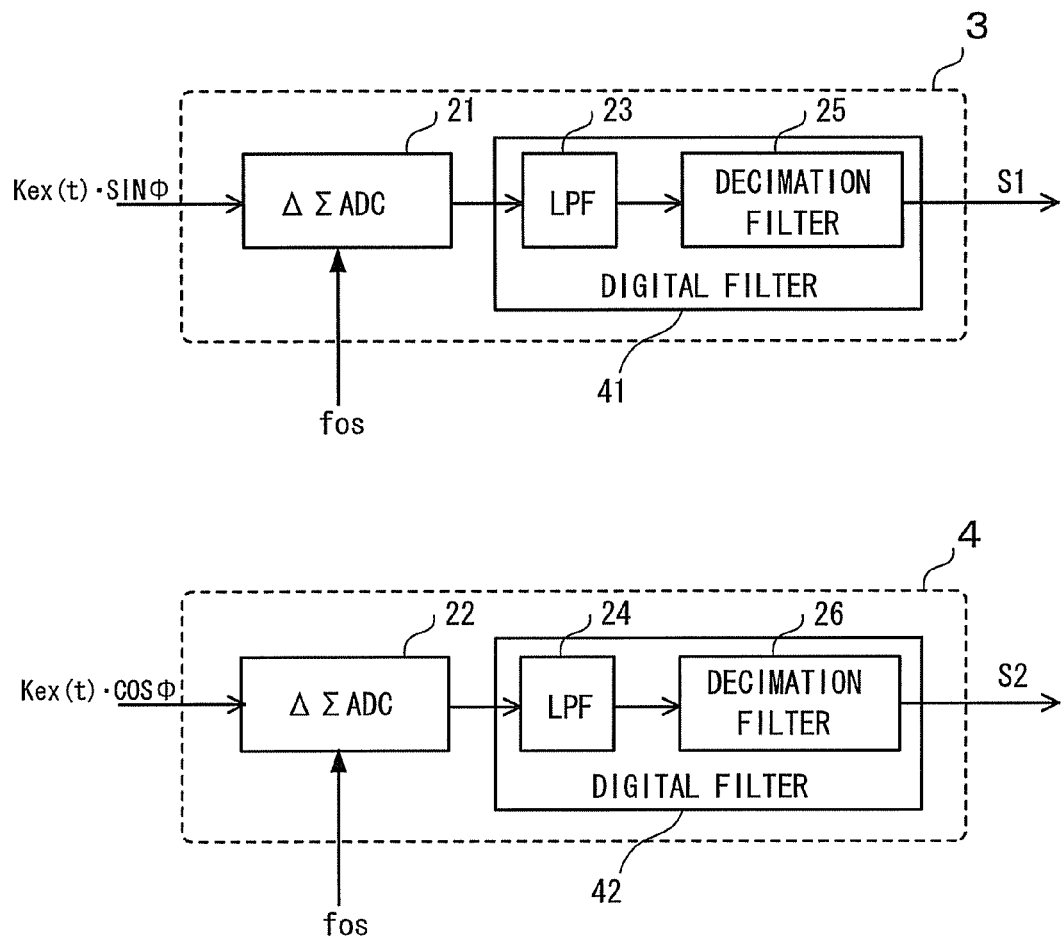
FIG. 2 is a block diagram showing configurations of A-D (analog-to-digital) converter units according to the first embodiment.
Figure 3:
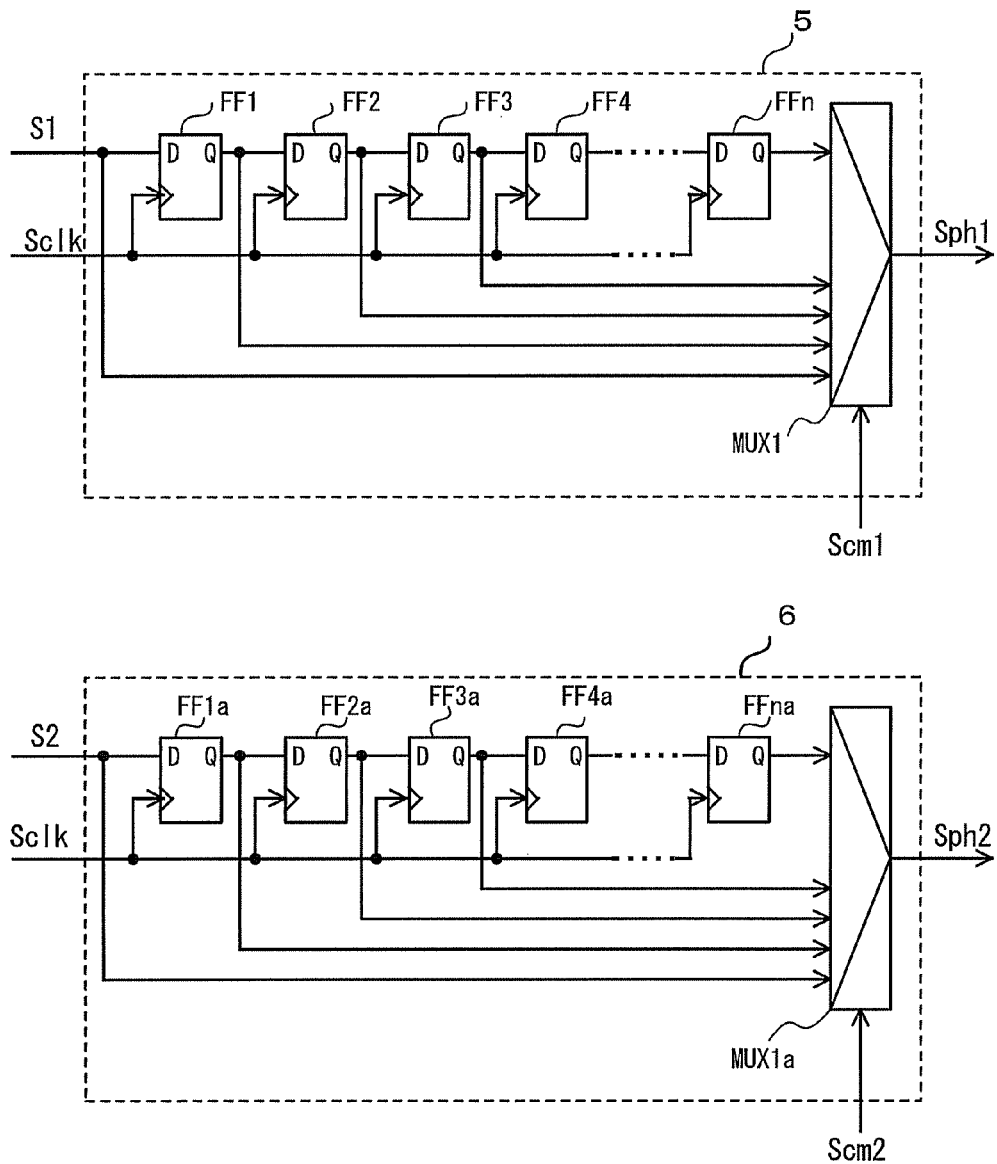
FIG. 3 is a block diagram showing configurations of delay circuits according to the first embodiment.
Figure 4:
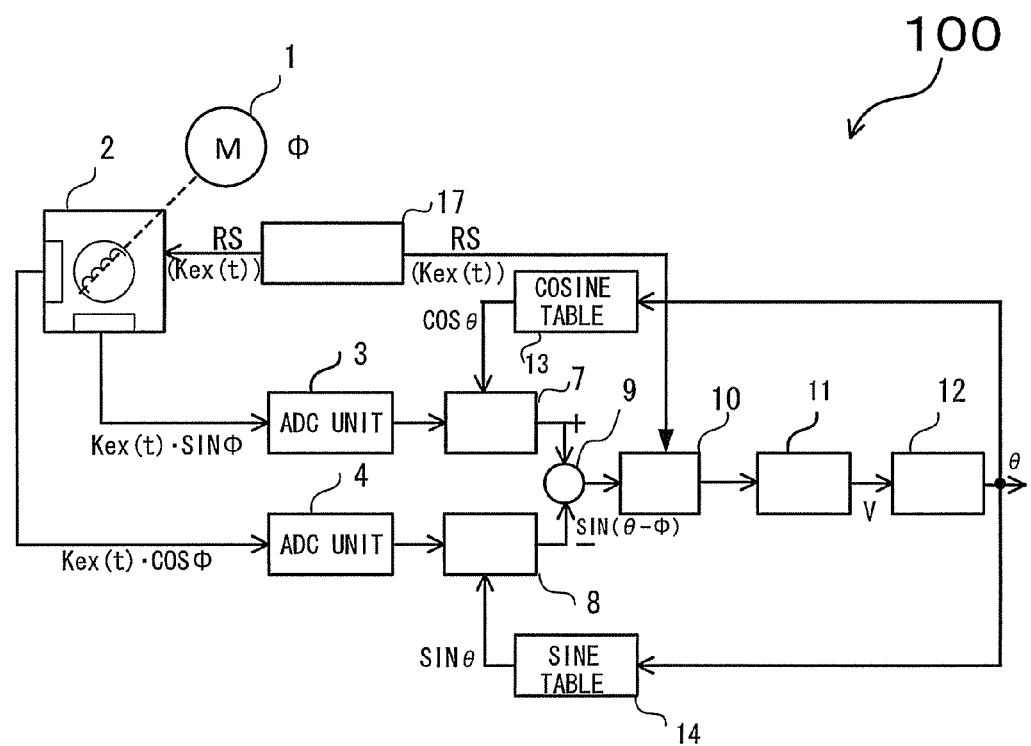
FIG. 4 is a block diagram showing an angle detection apparatus of a comparative example according to the first embodiment.

An angle detection apparatus according to a first embodiment will be described with reference to the drawings. FIG. 1 is a block diagram showing the angle detection apparatus. FIG. 2 is a block diagram showing configurations of A-D (analog-to-digital) converter units. FIG. 3 is a block diagram showing configurations of delay circuits. FIG. 4 is a block diagram showing an angle detection apparatus of a comparative example. The first embodiment involves detecting phases of two signals outputted by a resolver through the A-D converter units, and, at the occurrence of a phase shift, performing a phase adjustment to make the phases coincide with each other, using the delay circuits.

As shown in FIG. 1, an angle detection apparatus 90 includes a resolver 2, an A-D converter unit 3, an A-D converter unit 4, a delay circuit 5, a delay circuit 6, a multiplication unit 7, a multiplication unit 8, a subtracter 9, a synchronous detection unit 10, an angular velocity calculation unit 11, an integrator 12, a cosine table 13, a sine table 14, a bus 15, a microprocessor unit 16, and an excitation signal generation unit 17.

The resolver 2 is mounted to a motor 1 as a rotating device, and performs angle detection of the motor 1. Upon receipt of Kex(t) as an excitation signal RS outputted by the excitation signal generation unit 17, the resolver 2 generates a signal Kex(t)·SIN $\Phi$ by amplitude-modulating the excitation signal RS and a signal Kex(t)·COS $\Phi$ as a quadrature signal of the signal Kex(t)·SIN $\Phi$ in accordance with a rotation angle $\Phi$ of a rotary shaft of the motor 1 as the rotating device.

The signal Kex(t)·SIN $\Phi$ is inputted to the A-D converter unit 3, and the signal Kex(t)·COS $\Phi$ is inputted to the A-D converter unit 4. The A-D converter unit 3 is provided between the resolver 2 and the delay circuit 5, and generates an analog-to-digital converted signal. The A-D converter unit 4 is provided between the resolver 2 and the delay circuit 6, and generates an analog-to-digital converted signal.

As shown in FIG. 2, the A-D converter unit 3 includes a $\Delta\Sigma$ A-D converter 21 and a digital filter 41. The digital filter 41 includes an LPF (low-pass filter) 23 and a decimation filter 25. The A-D converter unit 4 includes a $\Delta\Sigma$ A-D converter 22 and a digital filter 42. The digital filter 42 includes an LPF 24 and a decimation filter 26.

The $\Delta\Sigma$ A-D converter 21 receives the signal Kex(t)·SIN $\Phi$, and the $\Delta\Sigma$ A-D converter 22 receives the signal Kex(t)·COS $\Phi$. The $\Delta\Sigma$ A-D converter 21 and the $\Delta\Sigma$ A-D converter 22 each perform sampling using an oversampling frequency fos as a sufficiently higher frequency than a target sampling frequency, and perform analog-to-digital conversion thereby to reduce quantization noise. The $\Delta\Sigma$ A-D converter 21 and the $\Delta\Sigma$ A-D converter 22 have a resolution of 12 to 16 bits, for example, and receive the oversampling frequency fos about $2^5$ times the target sampling frequency.

The LPF 23 is provided between the ΔΣ A-D converter 21 and the decimation filter 25, and eliminates quantization noise in a no-pass region (high frequency band) outputted by the ΔΣ A-D converter 21. The LPF 24 is provided between the ΔΣ A-D converter 22 and the decimation filter 26, and eliminates quantization noise in a no-pass region (high frequency band) outputted by the ΔΣ A-D converter 22.

The decimation filter 25 generates digital code having an ensured S/N (signal-to-noise) ratio by decimating signals outputted by the LPF 23, and outputs a signal S1 to the delay circuit 5. The decimation filter 26 generates digital code having an ensured S/N ratio by decimating signals outputted by the LPF 24, and outputs a signal S2 to the delay circuit 6.

The delay circuit 5 is provided between the A-D converter unit 3 and the multiplication unit 7, and the delay circuit 6 is provided between the A-D converter unit 4 and the multiplication unit 8. The delay circuit 5 and the delay circuit 6 have the same circuit configuration.

The delay circuit 5 performs a phase adjustment of the signal S1 outputted by the A-D converter unit 3 in response to a command from the microprocessor unit 16. The delay circuit 6 performs a phase adjustment of the signal S2 outputted by the A-D converter unit 4 in response to on a command from the microprocessor unit 16. Here, the phase adjustment is such an adjustment to make the phase of the signal S1 to coincide with the phase of the signal S2.

A signal Sph1 outputted by the delay circuit 5 and a signal Sph2 outputted by the delay circuit 6 are inputted via the bus 15 to the microprocessor unit 16, and are periodically monitored by the microprocessor unit 16. The microprocessor unit 16 functions as a phase detection adjustment unit. When the microprocessor unit 16 determines that a phase shift occurs in the signal Sph1 and the signal Sph2, the microprocessor unit 16 outputs a signal Scm1 to the delay circuit 5 via the bus 15, and outputs a signal Scm2 to the delay circuit 6 via the bus 15. The delay circuit 5 and the delay circuit 6 delay the signals and thereby perform a phase adjustment to make the phases coincide with each other in response to on the commands (namely, the signal Scm1 and the signal Scm2) from the microprocessor unit 16.

The phase adjustment will be described in more detail with reference to FIG. 3. As shown in FIG. 3, the delay circuit 5 includes n series-connected flip-flops (namely, a flip-flop FF1, a flip-flop FF2, a flip-flop FF3, a flip-flop FF4, . . . , a flip-flop FFn), and a selector MUX1. The delay circuit 6 includes n series-connected flip-flops (namely, a flip-flop FF1$a$, a flip-flop FF2$a$, a flip-flop FF3$a$, a flip-flop FF4$a$, . . . , a flip-flop FFna), and a selector MUX1$a$.

The flip-flop FF1 receives the signal S1 at a D port, latches the signal S1 on the rising edge of a clock signal Sclk, and outputs the latched signal at a Q port to the flip-flop FF2 and the selector MUX1. The flip-flop FF2 receives the signal outputted by the flip-flop FF1 at a D port, latches the signal on the rising edge of the clock signal Sclk, and outputs the latched signal at a Q port to the flip-flop FF3 and the selector MUX1. The flip-flop FF3 receives the signal outputted by the flip-flop FF2 at a D port, latches the signal on the rising edge of the clock signal Sclk, and outputs the latched signal at a Q port to the flip-flop FF4 and the selector MUX1. The flip-flop FF4 receives the signal outputted by the flip-flop FF3 at a D port, latches the signal on the rising edge of the clock signal Sclk, and outputs the latched signal at a Q port to the flip-flop FF5 (not shown) and the selector MUX1. The flip-flop FFn receives the signal outputted by the flip-flop FF(n−1) (not shown) at a D port, latches the signal on the rising edge of the clock signal Sclk, and outputs the latched signal at a Q port to the selector MUX1.

The selector MUX1 receives the signals outputted at the Q ports of the flip-flop FF1, the flip-flop FF2, the flip-flop FF3, the flip-flop FF4, . . . , the flip-flop FFn, respectively, and selectively outputs the signal Sph1 as a delay output signal obtained by performing a phase adjustment of the signal S1 by delaying the signal S1 by a predetermined time interval in response to the signal Scm1 as a delay output select signal outputted by the microprocessor unit 16.

The flip-flop FF1$a$ receives the signal S2 at a D port, latches the signal S2 on the rising edge of the clock signal Sclk, and outputs the latched signal at a Q port to the flip-flop FF2$a$ and the selector MUX1$a$. The flip-flop FF2$a$ receives the signal outputted by the flip-flop FF1$a$ at a D port, latches the signal on the rising edge of the clock signal Sclk, and outputs the latched signal at a Q port to the flip-flop FF3$a$ and the selector MUX1$a$. The flip-flop FF3$a$ receives the signal outputted by the flip-flop FF2$a$ at a D port, latches the signal on the rising edge of the clock signal Sclk, and outputs the latched signal at a Q port to the flip-flop FF4$a$ and the selector MUX1$a$. The flip-flop FF4$a$ receives the signal outputted by the flip-flop FF3$a$ at a D port, latches the signal on the rising edge of the clock signal Sclk, and outputs the latched signal at a Q port to the flip-flop FF5$a$ (not shown) and the selector MUX1$a$. The flip-flop FFna receives the signal outputted by the flip-flop FF(n−1)a (not shown) at a D port, latches the signal on the rising edge of the clock signal Sclk, and outputs the latched signal at a Q port to the selector MUX1$a$.

The selector MUX1$a$ receives the signals outputted from the Q ports of the flip-flop FF1$a$, the flip-flop FF2$a$, the flip-flop FF3$a$, the flip-flop FF4$a$, . . . , the flip-flop FFna, respectively, and selectively outputs the signal Sph2 as a delay output signal in response to the signal Scm2 as a delay output select signal outputted by the microprocessor unit 16. Here, the signal Sph2 is the signal S2 delayed by a predetermined time interval and adjusted in terms of phase.

The multiplication unit 7 is provided between the delay circuit 5 and the subtracter 9, and receives the phase-adjusted signal Sph1 outputted by the delay circuit 5. The multiplication unit 7 outputs a signal obtained by multiplying the phase-adjusted signal by a cosine function value COS θ with respect to a rotation angle θ as the previous calculated result fed back into the multiplication unit 7 by the cosine table 13.

The multiplication unit 8 is provided between the delay circuit 6 and the subtracter 9, and receives the phase-adjusted signal Sph2 outputted by the delay circuit 6. The multiplication unit 8 outputs a signal obtained by multiplying the phase-adjusted signal by a sine function value SIN θ with respect to the rotation angle θ as the previous calculated result fed back into the multiplication unit 8 by the sine table 14.

The subtracter 9 is provided between the multiplication units 7, 8 and the synchronous detection unit 10. The subtracter 9 subtracts the output signal from the multiplication unit 8 from the output signal from the multiplication unit 7 thereby to generate a signal Kex(t)·SIN(θ−Φ).

The synchronous detection unit 10 performs synchronous detection in synchronization with the excitation signal RS by sampling an output of the signal Kex(t)·SIN(θ−Φ) outputted by the subtracter 9. In other words, components of the excitation signal RS outputted by the subtracter 9 are eliminated, so that a signal SIN(θ−Φ) is outputted by the synchronous detection unit 10.

The angular velocity calculation unit 11 is provided between the synchronous detection unit 10 and the integrator 12. The angular velocity calculation unit 11 calculates angular velocity V of the motor 1 as the rotating device by integrating the signal outputted by the synchronous detection unit 10.

The integrator 12 integrates the angular velocity V outputted by the angular velocity calculation unit 11 thereby to calculate the rotation angle θ of the motor 1 as the rotating device.

In the angle detection apparatus 90, if the signal SIN(θ−Φ) outputted by the synchronous detection unit 10 is a control deviation ε, when the rotation angle θ as an output angle is equal to the rotation angle Φ as an input angle (θ=Φ), the control deviation ε is equal to zero (ε=0), and an equilibrium state is maintained. When the rotation angle Φ as the input angle changes to Φa, the control deviation ε is not equal to zero, and the rotation angle θ as the output angle is fed back so that θ becomes equal to Φa (θ=Φa) according to the polarity of the control deviation ε, and thereby, the control deviation ε becomes equal to zero (ε=0) and thus the equilibrium state is reached.

As shown in FIG. 4, an angle detection apparatus 100 of the comparative example includes a resolver 2, an A-D converter unit 3, an A-D converter unit 4, a multiplication unit 7, a multiplication unit 8, a subtracter 9, a synchronous detection unit 10, an angular velocity calculation unit 11, an integrator 12, a cosine table 13, a sine table 14, and an excitation signal generation unit 17.

The angle detection apparatus 100 of the comparative example is not provided with a delay circuit 5 and a delay circuit 6, as compared to the angle detection apparatus 90 of the first embodiment. Thus, description will be given only with regard to the points of difference.

The multiplication unit 7 is provided between the A-D converter unit 3 and the subtracter 9, and receives an analog-to-digital converted signal. The multiplication unit 7 outputs a signal obtained by multiplying a phase-adjusted signal by a cosine function value COS θ with respect to a rotation angle θ as the previous calculated result fed back into the multiplication unit 7 by the cosine table 13.

The multiplication unit 8 is provided between the A-D converter unit 4 and the subtracter 9, and receives an analog-to-digital converted signal. The multiplication unit 8 outputs a signal obtained by multiplying a phase-adjusted signal by a sine function value SIN θ with respect to the rotation angle θ as the previous calculated result fed back into the multiplication unit 8 by the sine table 14. In the angle detection apparatus 100 of the comparative example, phase adjustments of the signals outputted by the A-D converter unit 3 and the A-D converter unit 4 are not performed.

As described above, the angle detection apparatus of the first embodiment includes the resolver 2, the A-D converter unit 3, the A-D converter unit 4, the delay circuit 5, the delay circuit 6, the multiplication unit 7, the multiplication unit 8, the subtracter 9, the synchronous detection unit 10, the angular velocity calculation unit 11, the integrator 12, the cosine table 13, the sine table 14, the bus 15, the microprocessor unit 16, and the excitation signal generation unit 17. The microprocessor unit 16 receives the signal Sph1 outputted by the delay circuit 5 and the signal Sph2 outputted by the delay circuit 6, via the bus 15, and periodically monitors the signal Sph1 and the signal Sph2. If the microprocessor unit 16 determines that a phase shift occurs in the signal Sph1 and the signal Sph2, the microprocessor unit 16 outputs the signal Scm1 to the delay circuit 5 via the bus 15, and outputs the signal Scm2 to the delay circuit 6 via the bus 15. In response to the commands from the microprocessor unit 16, the delay circuit 5 and the delay circuit 6 delay the signals and thereby perform a phase adjustment to make the phases coincide with each other.

Thus, even if a phase shift occurs in input, the angle detection of the rotary shaft of the motor 1 can be performed with high accuracy. Also, delay values of the delay circuit 5 and the delay circuit 6 can be appropriately set by using the flip-flops, and thus, the angle detection apparatus 90 having resistance to a change with time can be provided.

Incidentally, in the first embodiment, the microprocessor unit 16 detects a phase shift by periodically monitoring the signal Sph1 and the signal Sph2. However, it is to be understood that the invention is not necessarily so limited. For example, a phase detection function may be provided externally to the microprocessor unit 16.

Figure 5:
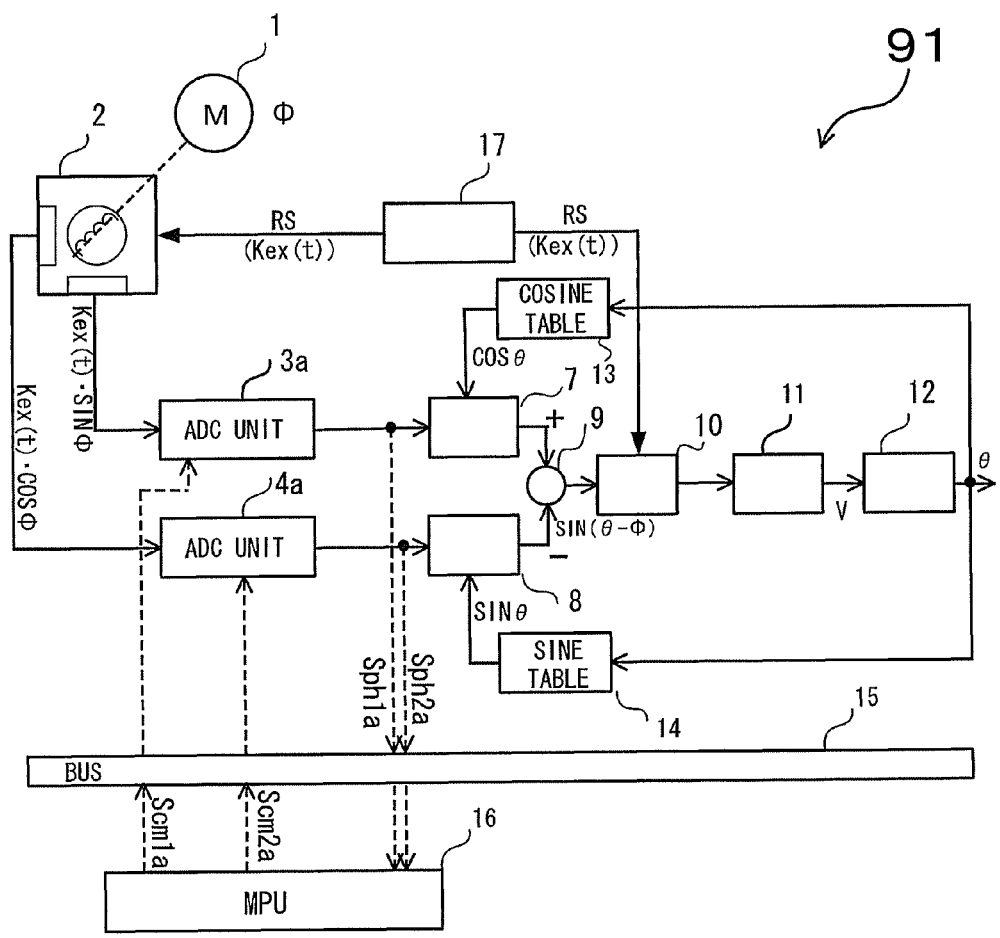
FIG. 5 is a block diagram showing an angle detection apparatus according to a second embodiment.
Figure 6:
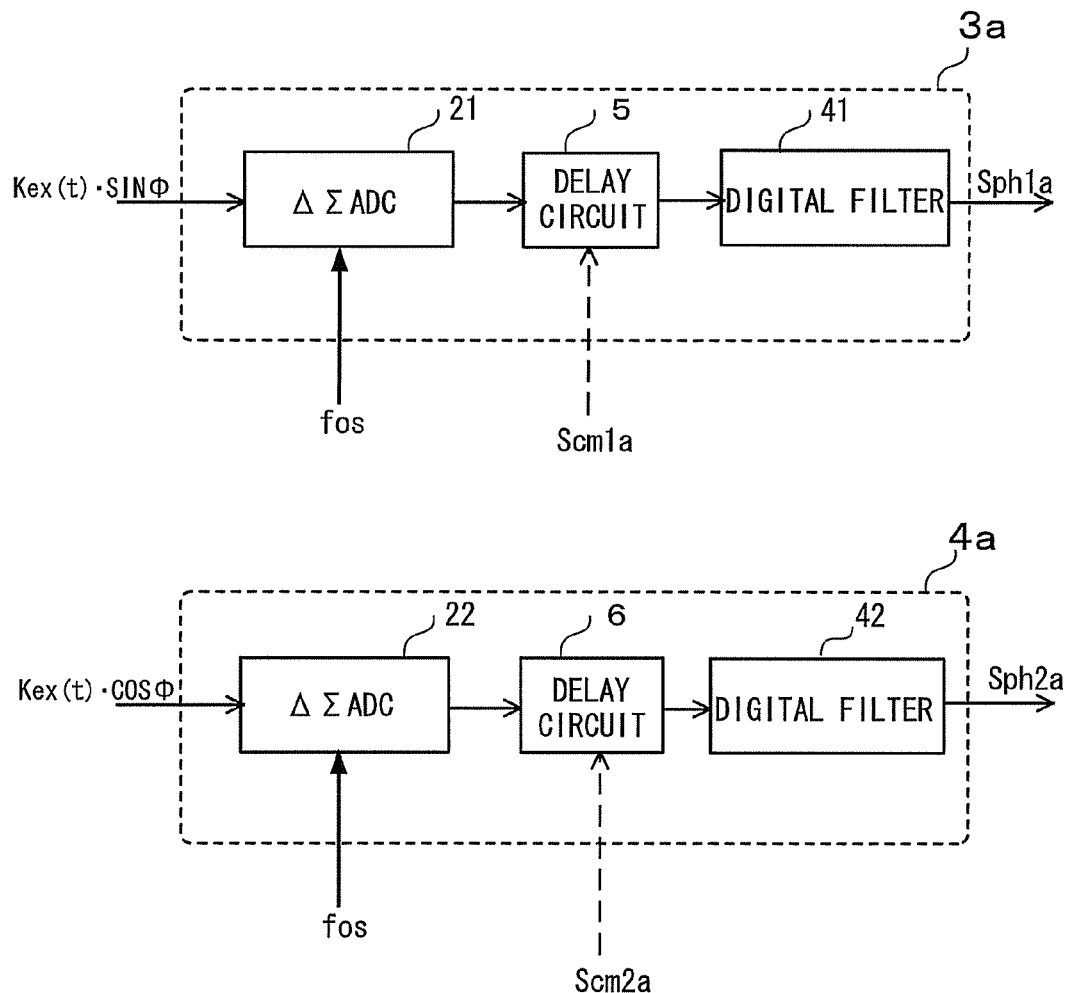
FIG. 6 is a block diagram showing configurations of A-D converter units according to the second embodiment.

An angle detection apparatus according to a second embodiment will be described with reference to the drawings. FIG. 5 is a block diagram showing the angle detection apparatus. FIG. 6 is a block diagram showing configurations of A-D converter units. In the second embodiment, after an A-D conversion process, a phase adjustment is performed to make the phases coincide with each other.

Hereinafter, the same constituent portions as those of the first embodiment are designated by the same reference numerals, description of the same portions will be omitted, and description will be given only with regard to different portions.

As shown in FIG. 5, an angle detection apparatus 91 includes a resolver 2, an A-D converter unit 3a, an A-D converter unit 4a, a multiplication unit 7, a multiplication unit 8, a subtracter 9, a synchronous detection unit 10, an angular velocity calculation unit 11, an integrator 12, a cosine table 13, a sine table 14, a bus 15, a microprocessor unit 16, and an excitation signal generation unit 17.

A signal Kex(t)·SIN Φ outputted by the resolver 2 is inputted to the A-D converter unit 3a, and a signal Kex(t)·COS Φ outputted by the resolver 2 is inputted to the A-D converter unit 4a. The A-D converter unit 3a is provided between the resolver 2 and the multiplication unit 7, and performs analog-to-digital conversion. The A-D converter unit 4a is provided between the resolver 2 and the multiplication unit 8, and performs analog-to-digital conversion.

A signal Sph1a outputted by the A-D converter unit 3a and a signal Sph2a outputted by the A-D converter unit 4a are inputted via the bus 15 to the microprocessor unit 16, and are periodically monitored by the microprocessor unit 16. The microprocessor unit 16 functions as a phase detection adjustment unit. When the microprocessor unit 16 determines that a phase shift occurs in the signal Sph1a and the signal Sph2a, the microprocessor unit 16 outputs a signal Scm1a to the A-D converter unit 3a via the bus 15, and outputs a signal Scm2a to the A-D converter unit 4a via the bus 15.

As shown in FIG. 6, the A-D converter unit 3a includes a ΔΣ A-D converter 21, a delay circuit 5, and a digital filter 41. The digital filter 41 includes an LPF 23 and a decimation filter 25. The A-D converter unit 4a includes a ΔΣ A-D converter 22, a delay circuit 6, and a digital filter 42. The digital filter 42 includes an LPF 24 and a decimation filter 26.

The delay circuit 5 is provided between the ΔΣ A-D converter 21 and the digital filter 41. The delay circuit 5 performs a phase adjustment of a signal outputted by the ΔΣ A-D converter 21, based on a command (namely, the signal Scm1a) from the microprocessor unit 16. The delay circuit 6 is provided between the ΔΣ A-D converter 22 and the digital filter 42. The delay circuit 6 performs a phase adjustment of a signal outputted by the ΔΣ A-D converter 22, based on a command (namely, the signal Scm2a) from the microprocessor unit 16.

Here, the output signals from the ΔΣ A-D converter 21 and the ΔΣ A-D converter 22 are higher in sampling frequency and fewer in the number of bits than the signal Sph1a outputted by the decimation filter 25 and the signal Sph2a outputted by the decimation filter 26. Thus, a finer signal phase adjustment can be set, as compared to the first embodiment.

As described above, the angle detection apparatus of the second embodiment includes the resolver 2, the A-D converter unit 3a, the A-D converter unit 4a, the multiplication unit 7, the multiplication unit 8, the subtracter 9, the synchronous detection unit 10, the angular velocity calculation unit 11, the integrator 12, the cosine table 13, the sine table 14, the bus 15, the microprocessor unit 16, and the excitation signal generation unit 17. The A-D converter unit 3a includes the ΔΣ A-D converter 21, the delay circuit 5, the LPF 23, and the decimation filter 25. The A-D converter unit 4a includes the ΔΣ A-D converter 22, the delay circuit 6, the LPF 24, and the decimation filter 26. The microprocessor unit 16 receives the signal Sph1a outputted by the decimation filter 25 and the signal Sph2a outputted by the decimation filter 26, via the bus 15, and periodically monitors the signal Sph1a and the signal Sph2a. When the microprocessor unit 16 determines that a phase shift occurs in the signal Sph1a and the signal Sph2a, the microprocessor unit 16 outputs a signal Scm1a to the delay circuit 5 via the bus 15, and outputs a signal Scm2a to the delay circuit 6 via the bus 15. The delay circuit 5 and the delay circuit 6 delay the signals and thereby perform a phase adjustment to make the phases coincide with each other, based on the commands from the microprocessor unit 16.

Thus, even if a phase shift occurs in input, the angle detection of the rotary shaft of the motor 1 can be performed with high accuracy. Also, the delay values of the delay circuit 5 and the delay circuit 6 can be appropriately set by using the flip-flops, and thus, the angle detection apparatus 91 having resistance to a change with time can be provided.

Figure 7:
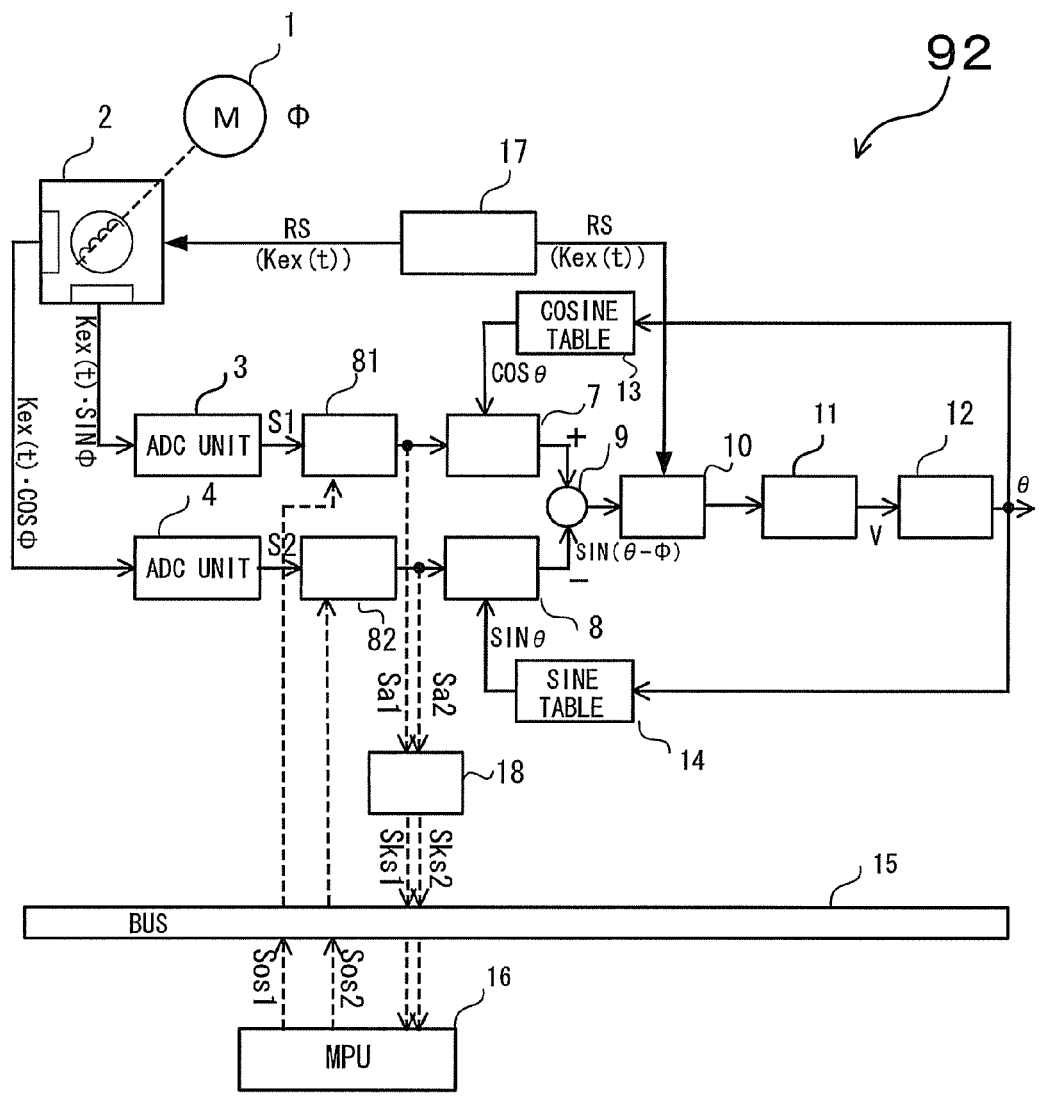
FIG. 7 is a block diagram showing an angle detection apparatus according to a third embodiment.
Figure 8:
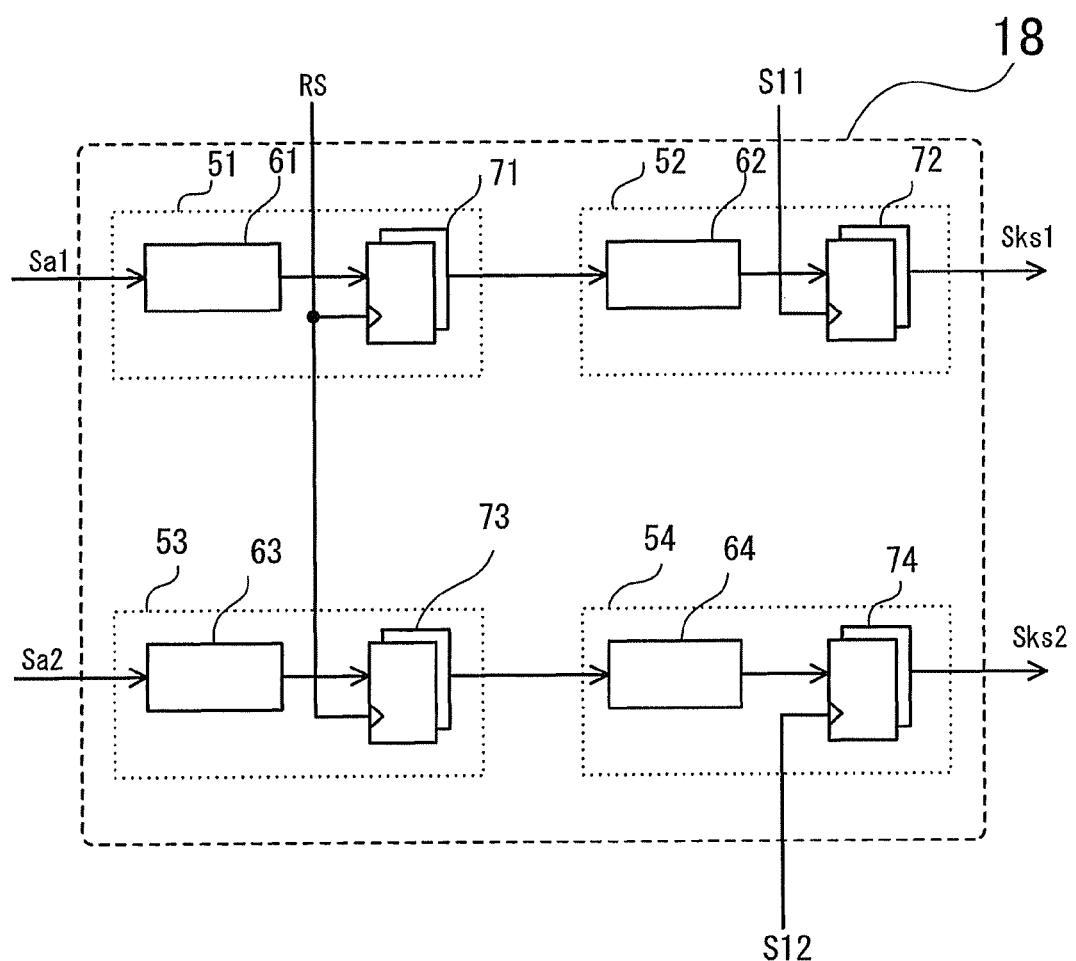
FIG. 8 is a block diagram showing a configuration of an amplitude detection unit according to the third embodiment.
Figure 9A:
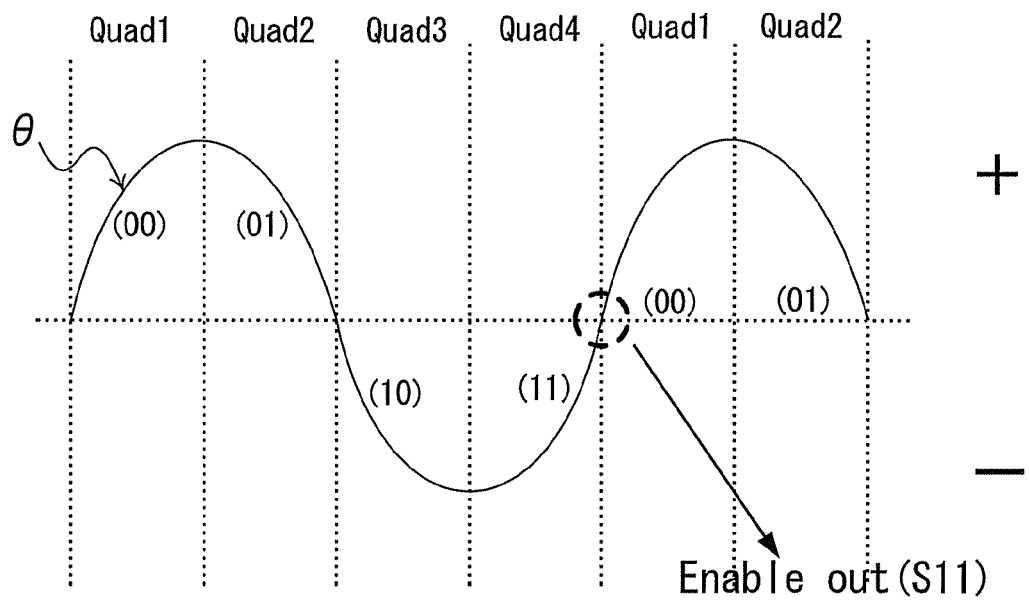
FIGS. 9A and 9B are graphs showing generation of a signal S11 and a signal S12, respectively, according to the third embodiment.
Figure 9B:
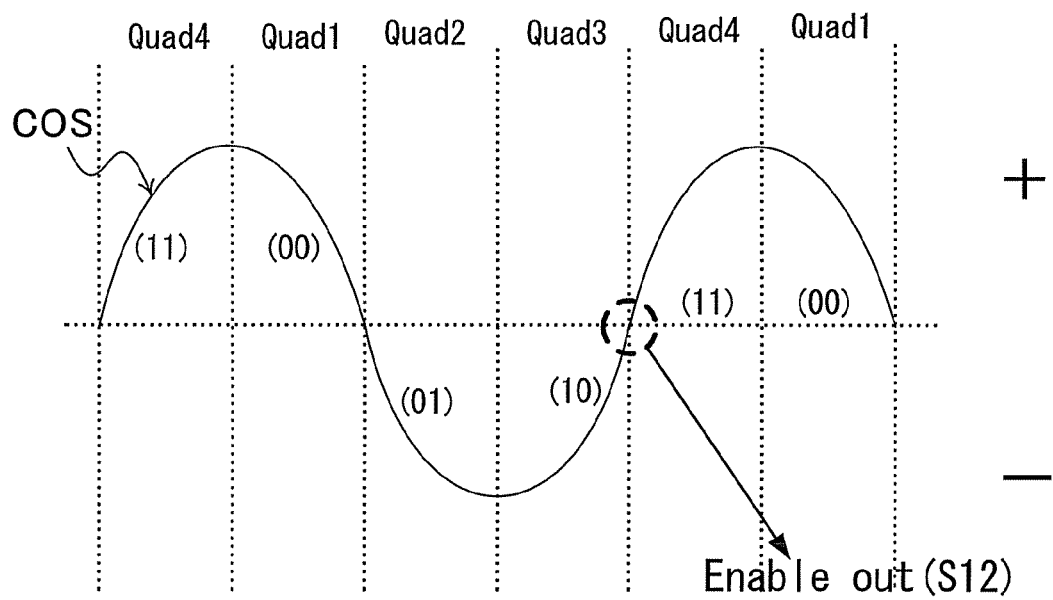

An angle detection apparatus according to a third embodiment will be described with reference to the drawings. FIG. 7 is a block diagram showing the angle detection apparatus. FIG. 8 is a block diagram showing a configuration of an amplitude detection unit. FIGS. 9A and 9B are graphs showing generation of a signal S11 and a signal S12, respectively. In the third embodiment, amplitude adjustment units perform an amplitude adjustment.

Hereinafter, the same constituent portions as those of the first embodiment are designated by the same reference numerals, description of the same portions will be omitted, and description will be given only with regard to different portions.

As shown in FIG. 7, an angle detection apparatus 92 includes a resolver 2, an A-D converter unit 3, an A-D converter unit 4, an amplitude adjustment unit 81, an amplitude adjustment unit 82, a multiplication unit 7, a multiplication unit 8, a subtracter 9, a synchronous detection unit 10, an angular velocity calculation unit 11, an integrator 12, a cosine table 13, a sine table 14, a bus 15, a microprocessor unit 16, an excitation signal generation unit 17, and an amplitude detection unit 18.

The amplitude adjustment unit 81 is provided between the A-D converter unit 3 and the multiplication unit 7, amplitude detection unit 18. The amplitude adjustment unit 82 is provided between the A-D converter unit 4 and the multiplication unit 8, amplitude detection unit 18. The amplitude adjustment unit 81 and the amplitude adjustment unit 82 have the same circuit configuration.

The amplitude adjustment unit 81 performs an amplitude adjustment of a signal S1 outputted by the A-D converter unit 3, based on a command from the microprocessor unit 16 as an amplitude adjustment calculation unit. The amplitude adjustment unit 82 performs an amplitude adjustment of a signal S2 outputted by the A-D converter unit 4, based on a command from the microprocessor unit 16 as the amplitude adjustment calculation unit.

The amplitude detection unit 18 is provided between the amplitude adjustment units 81, 82 and the bus 15. The amplitude detection unit 18 receives a signal Sa1 as a SIN amplitude detection input outputted by the amplitude adjustment unit 81, and generates a signal Sks1 as a first amplitude detection signal. The amplitude detection unit 18 receives a signal Sat as a COS amplitude detection input outputted by the amplitude adjustment unit 82, and generates a signal Sks2 as a second amplitude detection signal.

As shown in FIG. 8, the amplitude detection unit 18 includes a first detection unit 51, a second detection unit 52, a third detection unit 53, and a fourth detection unit 54.

The first detection unit 51 is provided between the amplitude adjustment unit 81 and the second detection unit 52. The first detection unit 51 includes a first maximum value detection unit 61 and a latch circuit 71. The first maximum value detection unit 61 receives the signal Sa1, and calculates the maximum value for each excitation. The latch circuit 71 data latches the maximum value calculated by the first maximum value detection unit 61, based on an excitation signal RS.

The second detection unit 52 is provided between the first detection unit 51 and the bus 15. The second detection unit 52 includes a second maximum value detection unit 62 and a latch circuit 72. The second maximum value detection unit 62 receives the signal latched by the latch circuit 71, and calculates the maximum value for each rotation. The latch circuit 72 data latches the maximum value calculated by the second maximum value detection unit 62, based on a signal S11 obtained by a trigger circuit (not shown) dividing a signal of the rotation angle θ outputted by the angle detection apparatus 92 into four portions, and outputs the signal Sks1.

As shown in FIG. 9A, the signal of the rotation angle θ is divided by the trigger circuit into four portions (2 bits), namely, Quad1 (data (00)), Quad2 (data (01)), Quad3 (data (10)), and Quad4 (data (11)). When changing from the data (11) to the data (00), the signal S11 changes to the signal in an enable state. The maximum value calculated by the second maximum value detection unit 62 is data latched, based on the signal S11 in the enable state.

The third detection unit 53 is provided between the amplitude adjustment unit 82 and the fourth detection unit 54. The third detection unit 53 includes a third maximum value detection unit 63 and a latch circuit 73. The third maximum value detection unit 63 receives the signal Sat, and calculates the maximum value for each excitation. The latch circuit 73 data latches the maximum value calculated by the third maximum value detection unit 63, in response to an excitation signal RS.

The fourth detection unit 54 is provided between the third detection unit 53 and the bus 15. The fourth detection unit 54 includes a fourth maximum value detection unit 64 and a latch circuit 74. The fourth maximum value detection unit 64 receives the signal latched by the latch circuit 73, and calculates the maximum value for each rotation. The latch circuit 74 data latches the maximum value calculated by the third maximum value detection unit 63, in response to a signal S12 obtained by a trigger circuit (not shown) dividing a signal cosine (COS) of the rotation angle θ into four portions, and outputs the signal Sks2.

As shown in FIG. 9B, the signal cosine (COS) of the rotation angle θ is divided by the trigger circuit into four portions (2 bits), namely, Quad4 (data (11)), Quad1 (data (00)), Quad2 (data (01)), and Quad3 (data (10)). When changing from the data (10) to the data (11), the signal S12 changes to the signal in an enable state. The maximum value calculated by the fourth maximum value detection unit 64 is data latched in response to the signal S12 in the enable state.

The signal Sks1 and the signal Sks2 outputted by the amplitude detection unit 18 are inputted via the bus 15 to the microprocessor unit 16, and are monitored at regular intervals by the microprocessor unit 16. The microprocessor unit 16 functions as the amplitude adjustment calculation unit. When the microprocessor unit 16 determines that a change in amplitude occurs in the signal Sa1 and the signal Sa2, the microprocessor unit 16 outputs a signal Sos1 as an amplitude adjustment signal to the amplitude adjustment unit 81 via the bus 15 and outputs a signal Sos2 as an amplitude adjustment signal to the amplitude adjustment unit 82 via the bus 15. In other words, the amplitude adjustment unit 81 and the amplitude adjustment unit 82 perform an amplitude adjustment in response to commands from the microprocessor unit 16.

As described above, the angle detection apparatus of the third embodiment includes the resolver 2, the A-D converter unit 3, the A-D converter unit 4, the amplitude adjustment unit 81, the amplitude adjustment unit 82, the multiplication unit 7, the multiplication unit 8, the subtracter 9, the synchronous detection unit 10, the angular velocity calculation unit 11, the integrator 12, the cosine table 13, the sine table 14, the bus 15, the microprocessor unit 16, the excitation signal generation unit 17, and the amplitude detection unit 18. The amplitude detection unit 18 detects the amplitude of the signal Sa1 outputted by the amplitude adjustment unit 81, and detects the amplitude of the signal Sa2 outputted by the amplitude adjustment unit 82. The microprocessor unit 16 receives the amplitude detection signal outputted by the amplitude detection unit 18 through the bus 15, and monitors the amplitude detection signal at regular intervals. If the microprocessor unit 16 determines that a change in amplitude occurs in the signal Sa1 and the signal Sa2, the microprocessor unit 16 outputs the signal Sos1 to the amplitude adjustment unit 81 via the bus 15 and outputs the signal Sos2 to the amplitude adjustment unit 82 via the bus 15. The amplitude adjustment unit 81 and the amplitude adjustment unit 82 perform an amplitude adjustment of the signals in response to the commands from the microprocessor unit 16.

Thus, even at the occurrence of a change in amplitude of an input, the angle detection of the rotary shaft of the motor 1 can be performed with high accuracy.

Figure 10:
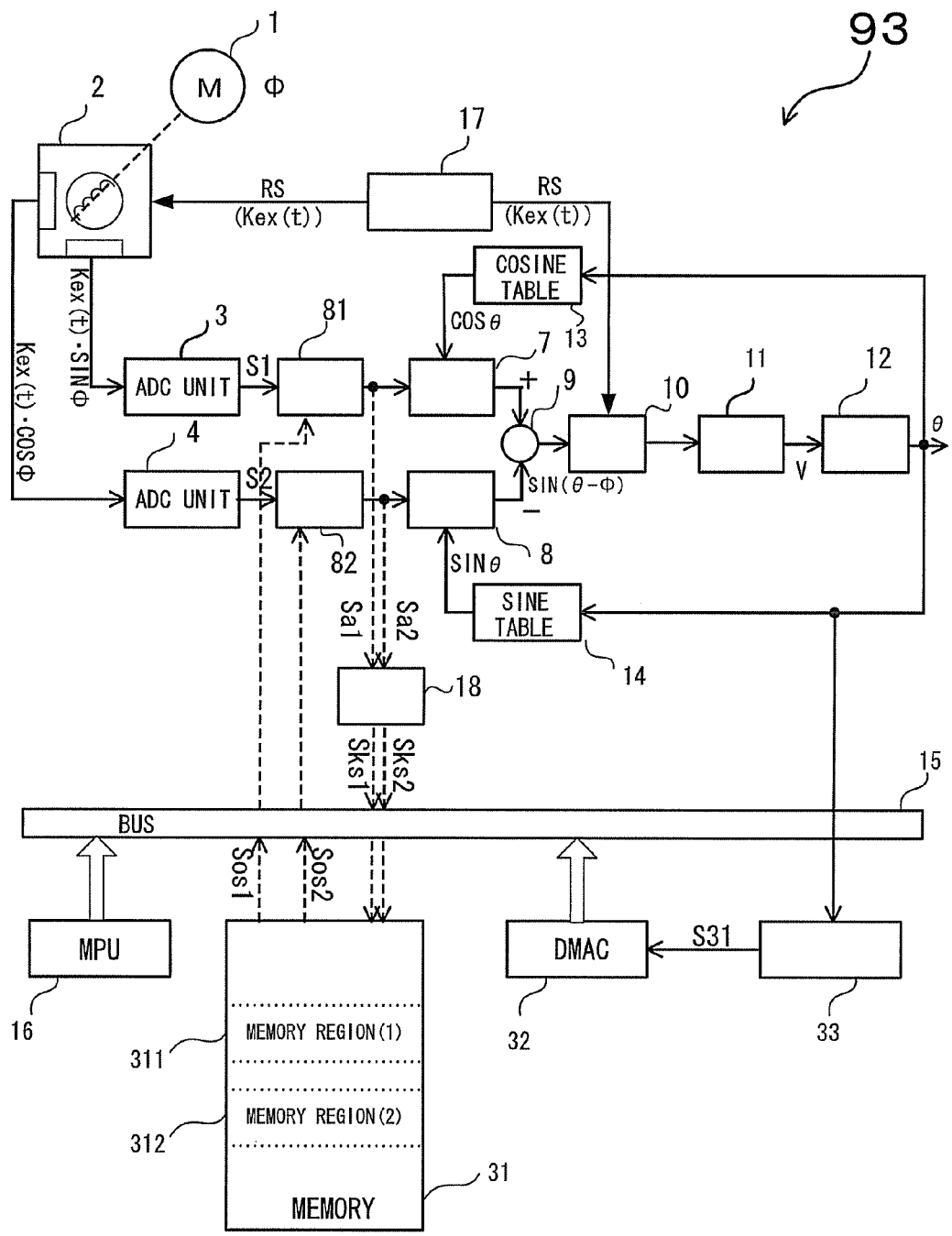
FIG. 10 is a block diagram showing an angle detection apparatus according to a fourth embodiment.
Figure 11:
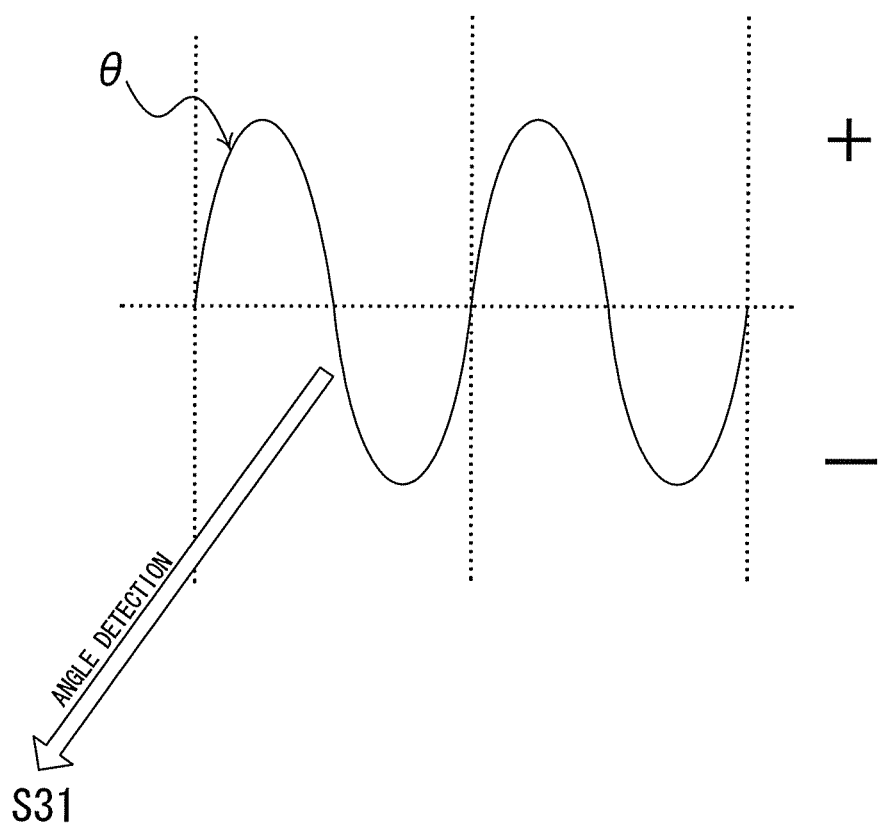
FIG. 11 is a graph showing generation of a signal S31 according to the fourth embodiment.

An angle detection apparatus according to a fourth embodiment will be described with reference to the drawings. FIG. 10 is a block diagram showing the angle detection apparatus. FIG. 11 is a graph showing generation of a signal S31. In the fourth embodiment, an amplitude adjustment unit is used to perform a phase adjustment in accordance with an electrical angle of the resolver.

Hereinafter, the same portions as those of the third embodiment are designated by the same reference numerals, description of the portions will be omitted, and different portions alone will be described.

As shown in FIG. 10, an angle detection apparatus 93 includes a resolver 2, an A-D converter unit 3, an A-D converter unit 4, an amplitude adjustment unit 81, an amplitude adjustment unit 82, a multiplication unit 7, a multiplication unit 8, a subtracter 9, a synchronous detection unit 10, an angular velocity calculation unit 11, an integrator 12, a cosine table 13, a sine table 14, a bus 15, a microprocessor unit 16, an excitation signal generation unit 17, an amplitude detection unit 18, a memory 31, a DMAC (direct memory access controller) 32, and an angle detection unit 33. The amplitude adjustment unit 81, the amplitude adjustment unit 82, the amplitude detection unit 18, the microprocessor unit 16, the memory 31, and the DMAC 32 are connected via the bus 15.

The angle detection unit 33 is provided between the integrator 12 and the DMAC 32. The angle detection unit 33 receives a signal of a rotation angle θ outputted by the angle detection apparatus 93. As shown in FIG. 11, the angle detection unit 33 detects the signal of the rotation angle θ for each rotation, and generates the signal S31 as an angle detection signal.

The memory 31 includes a first memory area 311 and a second memory area 312. The first memory area 311 stores information on the amplitude detection signals (namely, a signal Sks1 and a signal Sks2) outputted by the amplitude detection unit 18. The second memory area 312 stores an amplitude adjustment value calculated from a result of amplitude detection by the microprocessor unit 16.

The DMAC 32 starts operation in response to a command from the microprocessor unit 16. The DMAC 32 receives the signal S31, reads out the amplitude adjustment value stored in the second memory area 312 of the memory 31 for every one electrical angle of the resolver 2, and transfers the amplitude adjustment value via the bus 15 to the amplitude adjustment unit 81 and the amplitude adjustment unit 82.

The microprocessor unit 16 functions as the amplitude adjustment calculation unit. The microprocessor unit 16 reads out the amplitude detection signal information stored in the first memory area 311 of the memory 31 via the bus 15, and calculates the amplitude adjustment value. In other words, by the DMAC 32 that has received the command from the microprocessor unit 16, the amplitude adjustment unit 81 and the amplitude adjustment unit 82 perform the amplitude adjustment.

As described above, the angle detection apparatus of the fourth embodiment includes the resolver 2; the A-D converter unit 3, the A-D converter unit 4, the amplitude adjustment unit 81, the amplitude adjustment unit 82, the multiplication unit 7, the multiplication unit 8, the subtracter 9, the synchronous detection unit 10, the angular velocity calculation unit 11, the integrator 12, the cosine table 13, the sine table 14, the bus 15, the microprocessor unit 16, the excitation signal generation unit 17, the amplitude detection unit 18, the memory 31, the DMAC 32, and the angle detection unit 33. The DMAC 32 receives the signal S31 outputted by the angle detection unit 33, reads out the amplitude adjustment value stored in the second memory area 312 of the memory 31 for every one electrical angle of the resolver 2, and transfers the amplitude adjustment value to the amplitude adjustment unit 81 and the amplitude adjustment unit 82. By the DMAC 32, the amplitude adjustment unit 81 and the amplitude adjustment unit 82 perform the amplitude adjustment of the signal.

Thus, even if a change in amplitude occurs in input, the angle detection of the rotary shaft of the motor 1 can be performed with high accuracy. Also, as compared to the third embodiment, operations, control commands and the like executed by the microprocessor unit 16 can be reduced, thus enabling the use of a relatively inexpensive microprocessor unit and hence enabling a reduction in system cost of the angle detection apparatus 93.

It is to be understood that the invention is not limited to the above-described embodiments, and various changes could be made thereto without departing from the basic concept and scope of the invention.

In the first to fourth embodiments, the microprocessor unit 16 is used. However, it is to be understood that the invention is not necessarily so limited. For example, a CPU (central processing unit) or the like may be used in place of the microprocessor unit. Also, in the first and second embodiments, the flip-flops are used in the delay circuit 5 and the delay circuit 6. However, it is to be understood that the invention is not necessarily so limited. For example, latch circuits may be used in place of the flip-flops. In the first embodiment, the A-D converter unit 3, the A-D converter unit 4, the delay circuit 5, the delay circuit 6, the multiplication unit 7, the multiplication unit 8, the subtracter 9, the synchronous detection unit 10, the angular velocity calculation unit 11, the integrator 12, the cosine table 13, the sine table 14, the bus 15, the microprocessor unit 16, and the excitation signal generation unit 17 are provided in a package or a semiconductor chip. In the second embodiment, the A-D converter unit 3a, the A-D converter unit 4a, the multiplication unit 7, the multiplication unit 8, the subtracter 9, the synchronous detection unit 10, the angular velocity calculation unit 11, the integrator 12, the cosine table 13, the sine table 14, the bus 15, the microprocessor unit 16, and the excitation signal generation unit 17 are provided in a package or a semiconductor chip. In the third embodiment, the A-D converter unit 3, the A-D converter unit 4, the amplitude adjustment unit 81, the amplitude adjustment unit 82, the multiplication unit 7, the multiplication unit 8, the subtracter 9, the synchronous detection unit 10, the angular velocity calculation unit 11, the integrator 12, a cosine table 13, a sine table 14, a bus 15, a microprocessor unit 16, the excitation signal generation unit 17, and the amplitude detection unit 18 are provided in a package or a semiconductor chip.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An angle detection apparatus to perform angle detection of a rotary shaft of a rotating device to generate a first signal and a second signal orthogonal to the first signal by amplitude-modulating an excitation signal in accordance with a rotation angle using a resolver, comprising:
    a first A-D converter unit to receive the first signal, the first A-D converter unit to perform analog-to-digital conversion of the first signal;
    a second A-D converter unit to receive the second signal, the second A-D converter unit to perform analog-to-digital conversion of the second signal;
    a first delay circuit to receive a third signal outputted by the first A-D converter unit, the first delay circuit to perform a phase adjustment of the third signal;
    a second delay circuit to receive a fourth signal outputted by the second A-D converter unit, the second delay circuit to perform a phase adjustment of the fourth signal; and
    a phase detection adjustment unit to monitor phases of signals outputted by the first and second delay circuits, the phase detection adjustment unit to give phase adjustment commands to the first and second delay circuits, when a phase shift occurs.

2. The angle detection apparatus according to claim 1, wherein
    each of the first and second A-D converter units includes a $\Delta\Sigma$ A-D converter, an LPF (low-pass filter), and a decimation filter.

3. The angle detection apparatus according to claim 2, wherein
    the $\Delta\Sigma$ A-D converter executes sampling using an oversampling frequency sufficiently higher than a sampling frequency.

4. The angle detection apparatus according to claim 1, wherein
    the phase detection adjustment unit is any one of a microprocessor unit and a CPU (central processing unit).

5. The angle detection apparatus according to claim 1, wherein
    each of the first and second delay circuits performs the phase adjustment by using any one of a flip-flop and a latch circuit.

6. The angle detection apparatus according to claim 1, wherein
    the phase adjustment commands are provided via a bus.

7. The angle detection apparatus according to claim 1, wherein
    the first A-D converter unit, the second A-D converter unit, the first delay circuit, the second delay circuit, and the phase detection adjustment unit are provided in a package or a semiconductor chip.

8. An angle detection apparatus to perform angle detection of a rotary shaft of a rotating device to generate a first signal and a second signal orthogonal to the first signal by amplitude-modulating an excitation signal in accordance with a rotation angle using a resolver, comprising:
    a first A-D converter to receive the first signal, the first A-D converter to perform analog-to-digital conversion of the first signal;
    a second A-D converter to receive the second signal, the second A-D converter to perform analog-to-digital conversion of the second signal;
    a first delay circuit to receive a third signal outputted by the first A-D converter, the first delay circuit to perform a phase adjustment of the third signal;
    a second delay circuit to receive a fourth signal outputted by the second A-D converter, the second delay circuit to perform a phase adjustment of the fourth signal;
    a first digital filter to receive a fifth signal outputted by the first delay circuit, the first digital filter to eliminate noise of the fifth signal in a no-pass region;
    a second digital filter to receive a sixth signal outputted by the second delay circuit, the second digital filter to eliminate noise of the sixth signal in a no-pass region; and
    a phase detection adjustment unit to monitor phases of signals outputted by the first and second digital filters, the phase detection adjustment unit to give phase adjustment commands to the first and second delay circuits, when a phase shift occurs.

9. The angle detection apparatus according to claim 8, wherein
    each of the first and second digital filters includes an LPF and a decimation filter.

10. The angle detection apparatus according to claim 8, wherein
    the first and second A-D converters are $\Delta\Sigma$ A-D converters.

11. The angle detection apparatus according to claim 8, wherein
    the phase detection adjustment unit is any one of a microprocessor unit and a CPU.

12. The angle detection apparatus according to claim 8, wherein
    each of the first and second delay circuits performs the phase adjustment by using any one of a flip-flop and a latch circuit.

13. The angle detection apparatus according to claim 8, wherein
the phase adjustment commands are provided via a bus.

14. The angle detection apparatus according to claim 8, wherein
the first A-D converter, the second A-D converter, the first delay circuit, the second delay circuit, the first digital filter, the second digital filter, and the phase detection adjustment unit are provided in a package or a semiconductor chip.

15. An angle detection apparatus to perform angle detection of a rotary shaft of a rotating device to generate a first signal and a second signal orthogonal to the first signal by amplitude-modulating an excitation signal in accordance with a rotation angle using a resolver, comprising:
a first A-D converter unit to receive the first signal, the first A-D converter unit to perform analog-to-digital conversion of the first signal;
a second A-D converter unit to receive the second signal, the second A-D converter unit to perform analog-to-digital conversion of the second signal;
a first amplitude adjustment unit to receive a third signal outputted by the first A-D converter unit, the first amplitude adjustment unit to perform an amplitude adjustment of the third signal;
a second amplitude adjustment unit to receive a fourth signal outputted by the second A-D converter unit, the second amplitude adjustment unit to perform an amplitude adjustment of the fourth signal;
an amplitude detection unit to receive a fifth signal outputted by the first amplitude adjustment unit and receive a sixth signal outputted by the second amplitude adjustment unit, the amplitude detection unit to detect amplitude of the fifth signal and output a first amplitude detection signal, the amplitude detection unit to detect amplitude of the sixth signal and output a second amplitude detection signal; and
an amplitude adjustment calculation unit to monitor the first and second amplitude detection signals, the amplitude adjustment calculation unit to give amplitude adjustment commands to the first and second amplitude adjustment units, when a change in the amplitude occurs.

16. The angle detection apparatus according to claim 15, wherein
the amplitude detection unit includes first to fourth detection units,
the first detection unit detects a maximum value of the fifth signal for each excitation, the first detection unit latches the detected maximum value in response to the excitation signal, and the first detection unit outputs the maximum value as a seventh signal,
the second detection unit detects a maximum value of the seventh signal for each rotation, the second detection unit latches the detected maximum value in response to a rotation angle signal outputted by the angle detection apparatus, and the second detection unit outputs the maximum value as the first amplitude detection signal,
the third detection unit detects a maximum value of the sixth signal for each excitation, the third detection unit latches the detected maximum value in response to the excitation signal, and the third detection unit outputs the maximum value as an eighth signal, and
the fourth detection unit detects a maximum value of the eighth signal for each rotation, the fourth detection unit latches the detected maximum value in response to a cosine of the rotation angle signal, and the fourth detection unit outputs the maximum value as the second amplitude detection signal.

17. The angle detection apparatus according to claim 16, further comprising:
a memory, a DMAC (direct memory access controller), and an angle detection unit, wherein
the angle detection unit receives the rotation angle signal, and the angle detection unit outputs an angle detection signal for every one rotation,
the memory has a first memory area to store information on the first and second amplitude detection signals, and a second memory area to store an amplitude adjustment value calculated from an amplitude detection result by the amplitude adjustment calculation unit, and
the DMAC receives the angle detection signal, and the DMAC transfers the amplitude adjustment value to the first and second amplitude adjustment units for every one electrical angle of the resolver.

18. The angle detection apparatus according to claim 15, wherein
the amplitude adjustment calculation unit is any one of a microprocessor unit and a CPU.

19. The angle detection apparatus according to claim 15, wherein
each of the first and second A-D converter units includes a ΔΣ A-D converter, an LPF, and a decimation filter.

20. The angle detection apparatus according to claim 15, wherein
the first A-D converter unit, the second A-D converter unit, the first amplitude adjustment unit, the second amplitude adjustment unit, the amplitude detection unit, and the amplitude adjustment calculation unit are provided in a package or a semiconductor chip.

* * * * *